UNITED STATES PATENT OFFICE.

J. L. WELLS, OF ST. LOUIS, MISSOURI.

IMPROVEMENT IN COMPOSITIONS FOR TANNING.

Specification forming part of Letters Patent No. 30,367, dated October 9, 1860.

*To all whom it may concern:*

Be it known that I, J. L. WELLS, of St. Louis, Missouri, have invented a new and Improved Compound for Tanning Leather; and I do hereby declare that the following is a full, clear, and exact description of the manner of making and using the same.

The compound above referred to consists of the following ingredients used in the proportion specified—that is to say: catechu, one hundred pounds; soft water, one hundred and twenty-eight gallons; native sumac, one hundred and fifty pounds. These constituents, being well mixed together and dissolved, must be strained so as to be clear of sediment, and must be raised to a temperature of about 100° Fahrenheit, after which there must be added about eighty pounds of Glauber's salts, and about two pounds of niter, and about a quart of the sweet spirits of niter, and about two quarts of sweet oil cut in as much alcohol.

This composition, being prepared in a proper vat, is ready for use; but before the skins are introduced in it they must be first well blanched from lime, after which they should be handled into the compound for about one day of twenty-four hours, after which about one hundred pounds of catechu should be added, dissolved, and strained, as before. After this the skins should be handled in this compound until the strength thereof is taken up by the skins, which will take from one to two days, according to the condition of the skins. After this continue to add tanning-matter daily until the skins are sufficiently tanned, which usually takes from five to seven days.

The foregoing proportions make a solution which will tan about one hundred calf-skins.

The effect of this compound is to raise and open the hide, so as the more readily to receive the tannin, and at the same time it seems to precipitate the tannin and thus hasten the result. A calf-skin in this way can be tanned in twenty-four hours, and be softer, stronger, firmer, and in every way better than it could be tanned in three months after the old process.

I do not mean to confine myself to the proportions herein specified, as these may be varied and still produce the same result; but

What I claim as my invention, and desire to secure by Letters Patent, is—

The compound composed of the constituents above specified, or their equivalents, all of which I respectfully submit this 1st day of August, 1860.

J. L. WELLS.

Witnesses:
MORITZ RISSMAN,
ROLLIN B. GRAY.